US009467584B2

(12) United States Patent
Ooki

(10) Patent No.: US 9,467,584 B2
(45) Date of Patent: Oct. 11, 2016

(54) IMAGE READING APPARATUS, CONTROL METHOD THEREOF, IMAGE FORMING APPARATUS, AND COMPUTER-READABLE STORAGE MEDIUM

(71) Applicant: CANON FINETECH INC., Misato-shi, Saitama (JP)

(72) Inventor: Kenji Ooki, Sodegaura (JP)

(73) Assignee: CANON FINETECH, INC., Misato-Shi, Saitama (JP)

( * ) Notice: Subject to any disclaimer, the term of this patent is extended or adjusted under 35 U.S.C. 154(b) by 0 days.

(21) Appl. No.: 14/738,475

(22) Filed: Jun. 12, 2015

(65) Prior Publication Data

US 2016/0006893 A1    Jan. 7, 2016

(30) Foreign Application Priority Data

Jul. 7, 2014  (JP) ................................. 2014-139994
Apr. 9, 2015  (JP) ................................. 2015-080338

(51) Int. Cl.
*H04N 1/04*        (2006.01)
*H04N 1/00*        (2006.01)
(Continued)

(52) U.S. Cl.
CPC ...... *H04N 1/00814* (2013.01); *H04N 1/00551* (2013.01); *H04N 1/00588* (2013.01);
(Continued)

(58) Field of Classification Search
CPC ............. B65H 2701/1311; B65H 2701/1313; B65H 2513/40; B65H 2511/11; B65H 2513/512; B65H 2513/514; B65H 2801/39; H04N 2201/0015; H04N 2201/0084; H04N 2201/0041; H04N 2201/3204; H04N 1/00973

USPC ............ 358/1.15, 1.14, 474, 1.13, 498, 296, 358/302, 471, 501; 399/111, 329, 98, 110, 399/113, 116, 117, 119, 123, 16, 21, 254, 399/258, 262, 263, 304, 322, 394, 405; 271/109, 110, 2, 215, 3.14, 3.19
See application file for complete search history.

(56) References Cited

U.S. PATENT DOCUMENTS 4,472,049  A  *  9/1984  Honma ............... G03G 15/5012
                                                271/256
7,542,181  B2 *  6/2009  Kato .................. H04N 1/00795
                                                358/474
(Continued)

FOREIGN PATENT DOCUMENTS

JP      2001-189827      7/2001
JP      2005-123896      5/2005
(Continued)

OTHER PUBLICATIONS

Extended European Search Report dated Dec. 7, 2015, in counterpart European Patent Application No. EP 15172832.6.

*Primary Examiner* — Negussie Worku
(74) *Attorney, Agent, or Firm* — Fitzpatrick, Cella, Harper and Scinto

(57) ABSTRACT

An image reading apparatus comprising a reading unit, a detection unit, and a control unit, when the detection unit detects a closed state of the reading unit after the reading unit is opened in a reading operation by the reading unit, if the reading operation is able to be restarted from a state of suspension in which a conveyance of the document by the reading unit is suspended, the control unit controls the reading unit to restart the reading operation from the state of suspension.

24 Claims, 10 Drawing Sheets

(51) Int. Cl.
*H04N 1/10* (2006.01)
*H04N 1/32* (2006.01)

(52) U.S. Cl.
CPC ...... *H04N1/00811* (2013.01); *H04N 1/00917* (2013.01); *H04N 1/1061* (2013.01); *H04N 1/3263* (2013.01); *H04N 1/32667* (2013.01); *H04N 2201/0093* (2013.01); *H04N 2201/0094* (2013.01)

(56) References Cited

U.S. PATENT DOCUMENTS

| | | | | |
|---|---|---|---|---|
| 7,719,726 B2* | 5/2010 | Kamei | ............... | H04N 1/00002 358/463 |
| 8,279,497 B2* | 10/2012 | Nakano | ............... | H04N 1/00013 358/401 |
| 8,390,841 B2* | 3/2013 | Suzuki | ............... | H04N 1/00222 358/1.15 |
| 8,428,332 B1* | 4/2013 | Csulits | ................... | G07F 19/20 235/379 |
| 8,744,321 B2* | 6/2014 | Kubota | ............. | G03G 21/1676 399/263 |
| 9,145,276 B2* | 9/2015 | Kasamatsu | ............. | B65H 7/20 |
| 2003/0053153 A1 | 3/2003 | Morisaki | ....................... | 358/498 |
| 2006/0012837 A1 | 1/2006 | Ishikawa | ....................... | 358/474 |
| 2009/0021803 A1* | 1/2009 | Tagawa | ............... | H04N 1/00968 358/488 |
| 2009/0201561 A1* | 8/2009 | Hwang | ............... | H04N 1/00917 358/498 |
| 2010/0078882 A1* | 4/2010 | Kusama | ................. | B65H 31/02 271/258.05 |
| 2010/0079827 A1* | 4/2010 | Matsushima | ...... | H04N 1/00567 358/498 |
| 2010/0080640 A1* | 4/2010 | Matsushima | .......... | B65H 43/02 399/372 |
| 2010/0110504 A1* | 5/2010 | Shimada | ............ | H04N 1/32609 358/474 |
| 2011/0013960 A1* | 1/2011 | Ito | ........................ | G03G 15/602 399/371 |
| 2011/0032585 A1 | 2/2011 | Kasahara | ....................... | 358/498 |
| 2011/0228285 A1* | 9/2011 | Kohara | ............. | G03G 15/0409 358/1.2 |
| 2011/0228347 A1* | 9/2011 | Kohara | .................. | G03G 15/36 358/446 |
| 2013/0148176 A1* | 6/2013 | Hiro | .................. | H04N 1/00909 358/498 |
| 2014/0300938 A1* | 10/2014 | Oosaki | ............... | H04N 1/00655 358/498 |

FOREIGN PATENT DOCUMENTS

| | | |
|---|---|---|
| JP | 2009-027370 | 2/2009 |
| JP | 2010-245661 | 10/2010 |

\* cited by examiner

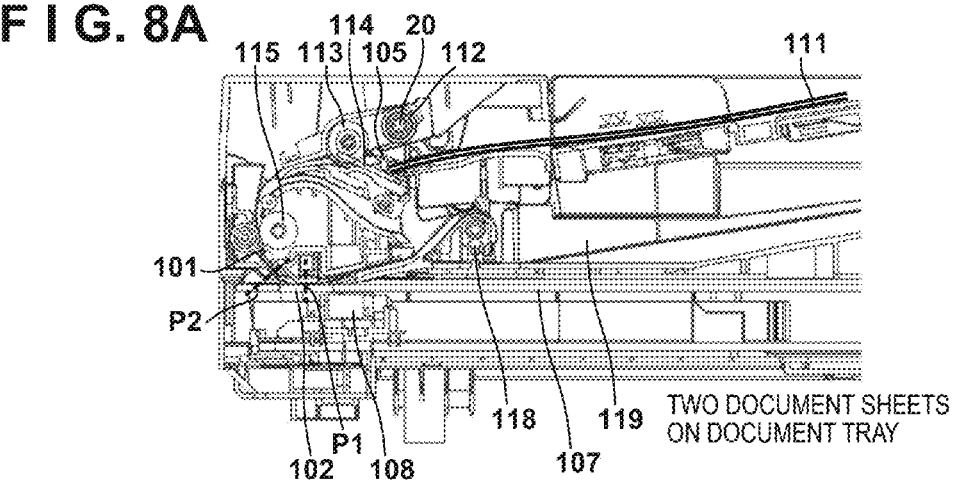
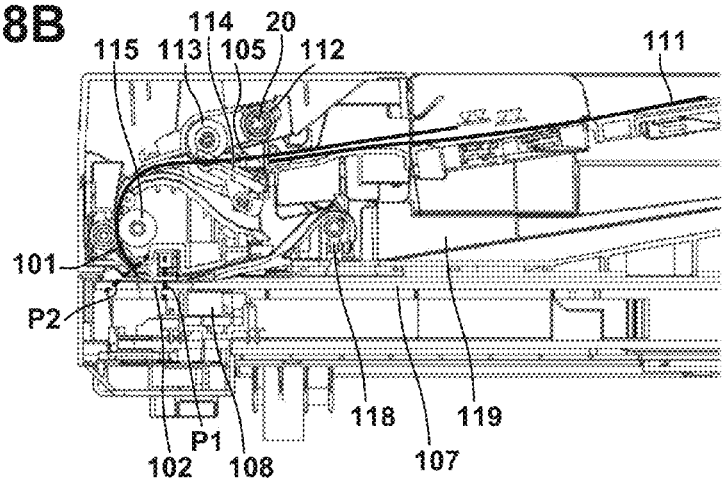
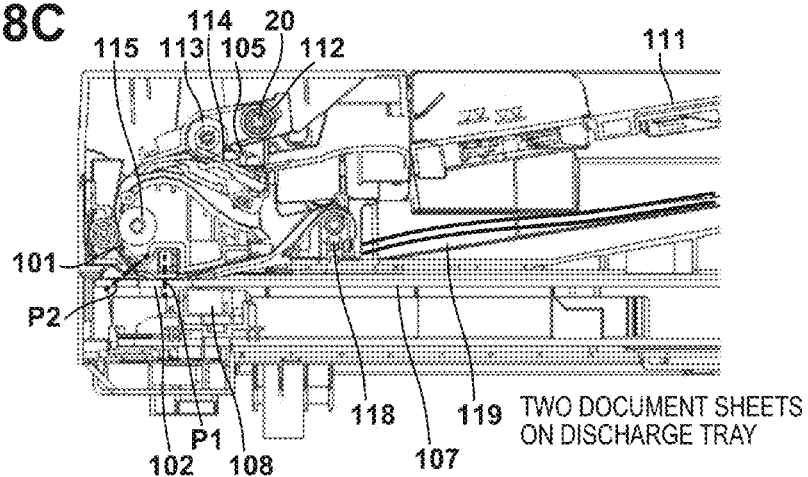

IMAGE READING APPARATUS, CONTROL METHOD THEREOF, IMAGE FORMING APPARATUS, AND COMPUTER-READABLE STORAGE MEDIUM

BACKGROUND OF THE INVENTION

1. Field of the Invention

The present invention relates to an image reading apparatus that conveys a document to a reading region and reads the document image, a control method thereof, an image forming apparatus, and a computer-readable storage medium.

2. Description of the Related Art

Conventionally, there is an image reading apparatus that reads a document image by a reading portion such as an image sensor while conveying the document. The reading portion reads the image of a document conveyed at a predetermined speed. If the document conveyance path is opened during reading, the document conveyance speed cannot be kept constant, and an abnormality such as misregistration appears in the read document image.

To solve this, in Japanese Patent Laid-Open No. 2005-123896, the reading portion detects that the document conveyance path has been opened during image reading. It is determined that a paper jam or invalid scanning has occurred, and the conveyance of the document is stopped.

For example, when directly FAXing image data of a document read by the image reading apparatus, the conveyance of the document is sometimes temporarily stopped for line connection. In the case of a multifunction peripheral including the image reading apparatus, when processing other than the image reading operation is performed at the same time as the image reading operation of a document, the image reading and conveyance of the document are temporarily stopped in some cases. At this time, the user may open the document conveyance path in order to confirm the conveyance state of the document.

SUMMARY OF THE INVENTION

However, in the technique of Japanese Patent Laid-Open No. 2005-123896, when it is detected that the document conveyance path has been opened, even if the conveyance of a document is temporarily stopped and normal reading can be restarted, it may be determined that a paper jam has occurred, and the conveyance of the document may be stopped. Thus, the reading of the document cannot be restarted until the document in the document conveyance path is removed, impairing usability.

The present invention provides a technique capable of improving usability in image reading of a conveyed document.

According to an aspect of the present invention, an image reading apparatus comprises the following arrangement. That is, an image reading apparatus comprises a reading unit configured to perform a reading operation of conveying a document to a reading region and reading an image of the document while conveying the document in the reading region, the reading unit being able to open and close the reading region, a detection unit configured to detect an closed state of the reading unit, and a control unit configured to, when the detection unit detects the closed state of the reading unit after the reading unit is opened in the reading operation by the reading unit, if the reading operation is able to be restarted from a state of suspension in which the conveyance of the document by the reading unit is suspended, control the reading unit to restart the reading operation from the state of suspension.

The present invention can improve usability in image reading of a conveyed document.

Further features of the present invention will become apparent from the following description of exemplary embodiments (with reference to the attached drawings).

BRIEF DESCRIPTION OF THE DRAWINGS

FIGS. 8A to 8C are views showing the state of an ADF in the document reading control sequence;

DESCRIPTION OF THE EMBODIMENTS

Embodiments of the present invention will now be described in detail with reference to the accompanying drawings.

Figure 1:
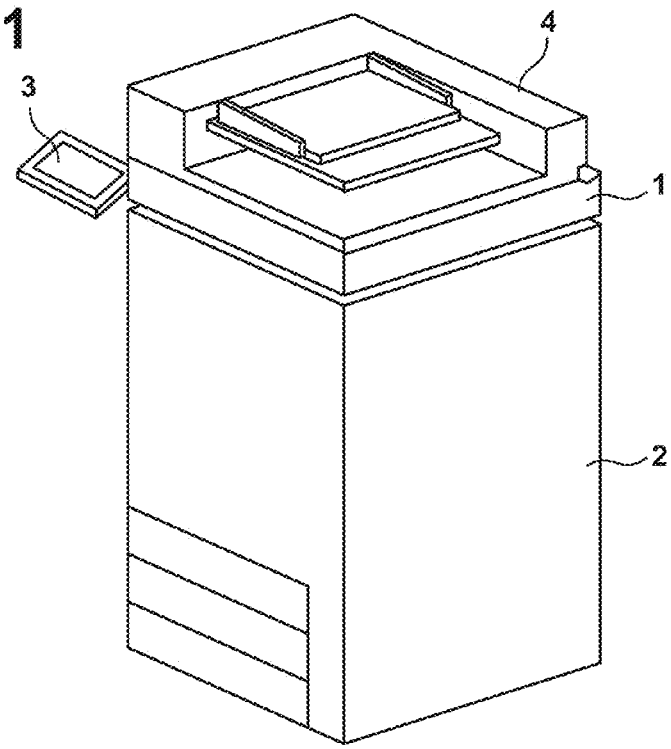
FIG. 1 is a schematic perspective view showing an example of an image forming apparatus including an image reading apparatus.

First, an image forming apparatus 2 including an image reading apparatus 1 will described with reference to FIG. 1. As shown in FIG. 1, the image forming apparatus 2 performs image formation on a printing medium such as a sheet based on image data obtained by a reading operation by the image reading apparatus 1 arranged on the image forming apparatus 2, or image data transmitted from a terminal apparatus such as an external personal computer communicably connected to the image forming apparatus 2. More specifically, the image forming apparatus 2 forms an image based on image data on a sheet in the internal cassette of the image forming apparatus 2 or a manually inserted sheet, and outputs the sheet in a state in which the image is fixed on the sheet. Note that image data obtained by the reading operation of the image reading apparatus 1 may be transmitted to an external terminal apparatus, in addition to forming an image on a sheet by the image forming apparatus 2.

Figure 2:
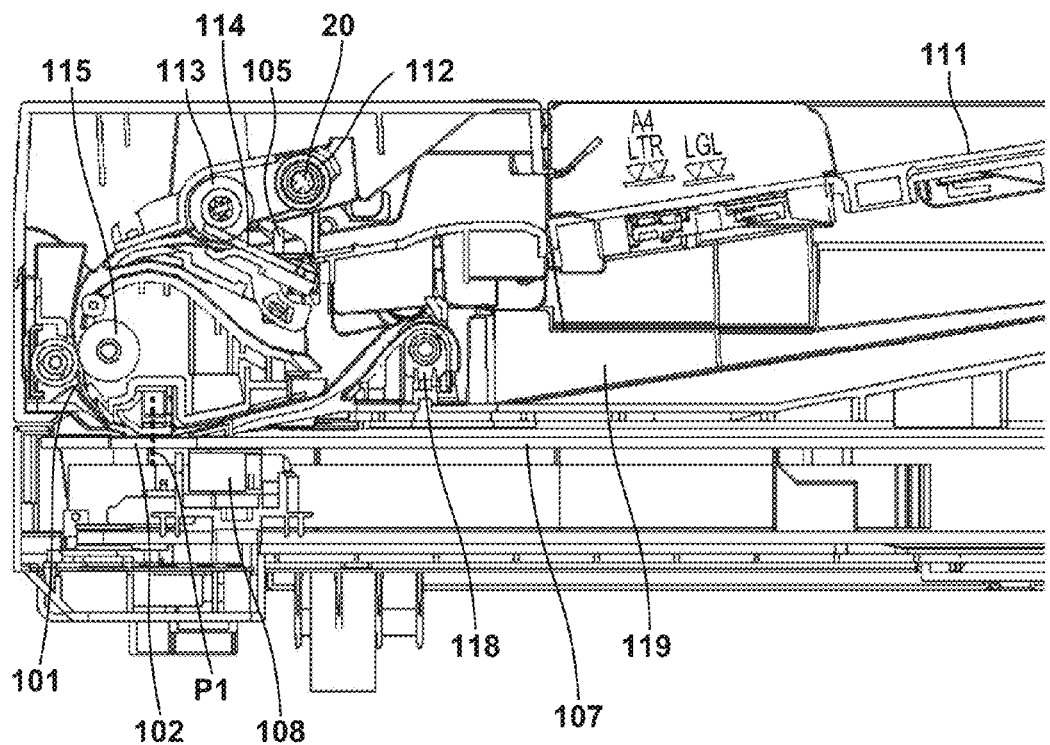
FIG. 2 is a partial sectional view showing the image reading apparatus.

Various user operations regarding the image reading apparatus 1 and the image forming apparatus 2, including an instruction about reading of an image and various settings are performed via an operation unit 3. The operation unit 3 is formed from, for example, a touch panel constituted by integrating a display unit and an operation unit. The image reading apparatus 1 can perform two types of reading operations. One of these reading operations is a reading operation (platen reading) of reading a document set on a platen glass 107 (FIG. 2). The other operation is a reading operation (flow scanning) of reading a document conveyed to a reading position P1 (FIG. 2) of a flow scanning glass 102 (FIG. 2) inside the apparatus by an ADF (Auto Document Feeder) 4.

Assume that the main scanning direction is a direction (in this embodiment, a direction perpendicular to) crossing a conveyance direction (sub-scanning direction) in which a document is conveyed by the ADF 4 serving as a conveyance portion configured to convey a document. The main scanning width of a normal document corresponds to the lateral width of the document (width in the widthwise direction). The sub-scanning width of the document corresponds to the longitudinal width of the document (width in the lengthwise direction). Platen reading indicates a reading operation by a flatbed type scanner, that is, a reading operation of fixing a document on the platen glass 107 (FIG. 2), and while irradiating the document with light from below it, scanning a reading sensor 108 (FIG. 2) to read the document image. The reading operation of flow scanning indicates a reading operation of irradiating a document conveyed to the reading position P1 of the flow scanning glass 102 inside the apparatus by the ADF 4 with light via the flow scanning glass 102 by the reading sensor 108 stopped below the flow scanning glass 102, and receiving the reflected light to read the document image.

Next, the reading operation of flow scanning by the reading sensor 108 and the ADF 4 will be described in detail with reference to FIG. 2. FIG. 2 is a partial sectional view showing the image reading apparatus 1 and ADF 4 shown in FIG. 1.

First, the user sets document sheets on a document tray 111. When the user designates the start of reading via the operation unit 3, the image reading apparatus 1 uses a CPU (as a control unit, FIG. 3: to be described later) to drive a conveyance motor 20, move down a pickup roller 112 while rotating it, and bring it into contact with the document sheet. The document sheets to be fed by the pickup roller 112 are separated and conveyed one by one by a separation roller 113 and a separation pad 114. A document detection sensor 105 can detect whether document sheets have been set on the document tray 111. Also, the document detection sensor 105 can detect whether a document sheet set on the document tray 111 is a final sheet. The separated document sheet is conveyed into the apparatus by a read roller 115. A read sensor 101 detects the leading end of the document sheet conveyed by the read roller 115, and the reading start timing at the reading position P1 serving as a document reading region is decided.

After that, when the document sheet passes on the flow scanning glass 102 (transparent member), the reading sensor 108 reads the document image at the reading position P1 from below the document sheet. When reading the two surfaces of the document sheet, a discharge/reverse roller 118 rotates reversely to convey the document sheet in a direction opposite to the discharge direction so as to convey the document sheet again into the apparatus. Then, the discharge/reverse roller 118 is rotated in the discharge direction. The document sheet, images on the two surfaces of which have been read, is discharged to a discharge tray 119.

Figure 3:
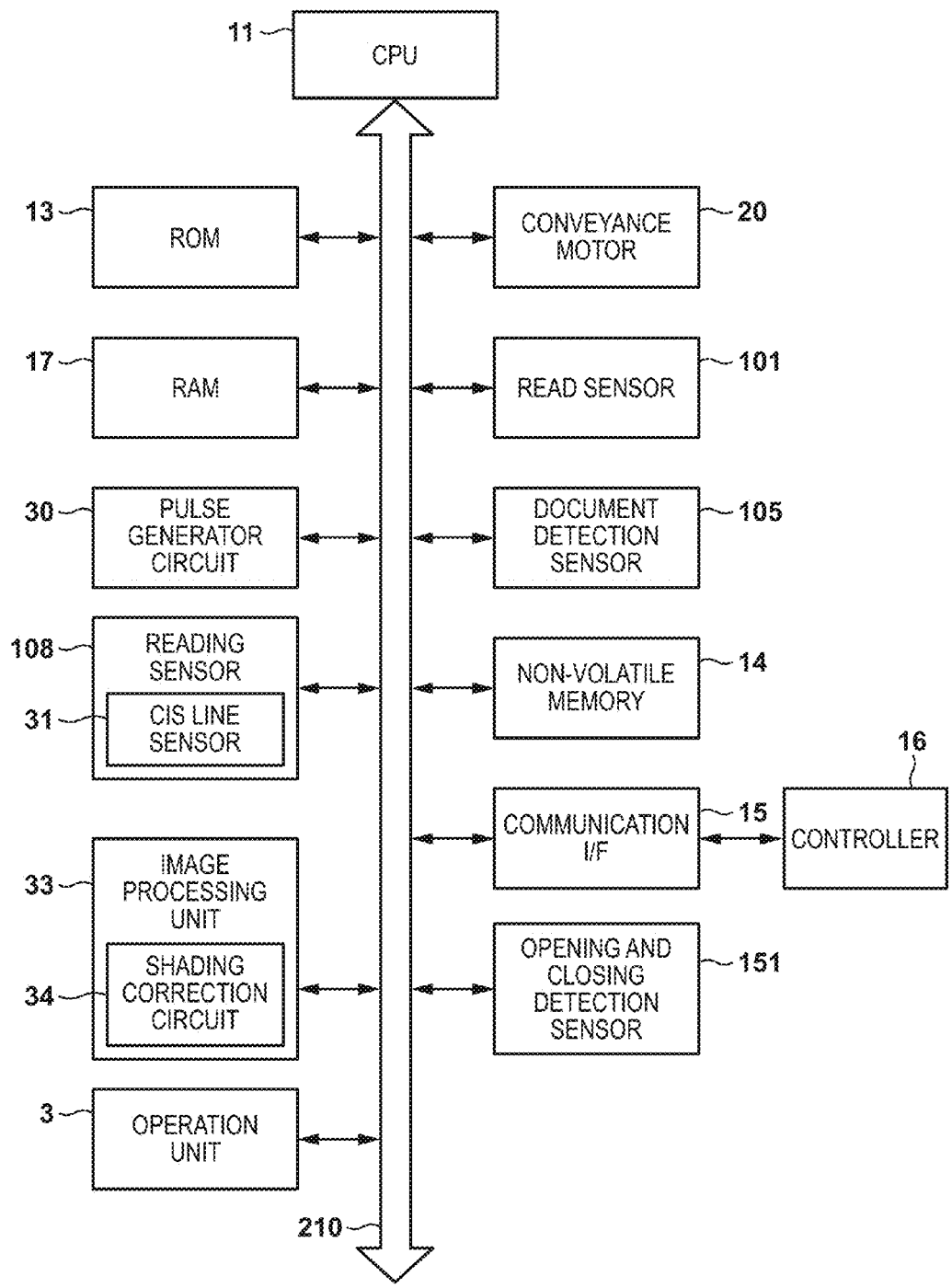
FIG. 3 is a circuit block diagram showing the image reading apparatus.

FIG. 3 is a circuit block diagram showing the image reading apparatus in FIG. 1.

The image reading apparatus 1 includes a CPU 11, a ROM 13, a conveyance motor 20, a RAM 17, the read sensor 101, a pulse generator circuit 30, and a document detection sensor 105. The image reading apparatus 1 also includes the reading sensor 108, a non-volatile memory 14, a communication I/F 15, an image processing unit 33, and an opening and closing detection sensor 151 serving as a detection unit. These building components are connected to each other via a bus 210, and the bus 210 functions as a data communication path between various building components.

The CPU 11 controls the operation of the overall apparatus. The RAM 17 serves as a work area for the CPU 11 and a temporary storage area for data. The ROM 13 stores a firmware program for driving the image reading apparatus 1 and a boot program for controlling the firmware program, and is used by the CPU 11. The non-volatile memory 14 stores various settings.

The communication I/F 15 is connected to a controller 16 and an external apparatus (information processing apparatus), and image data is communicated via the communication I/F 15. The controller 16 is a control portion that executively controls the image reading apparatus 1 and the image forming apparatus 2. The image reading apparatus 1 performs the reading operation of a document image upon receiving a reading request from the controller 16.

The CPU 11 of the image reading apparatus 1 communicates with the controller 16 via the communication I/F 15 and can transmit image data to an external FAX apparatus. The image forming apparatus 2 can form an image on a sheet based on image data read by the reading sensor 108.

The reading sensor 108 includes a CIS line sensor 31. A document to be read is irradiated with light from a light source. The reflected light is received by the CIS line sensor 31 and converted into a luminance value, thereby converting the document image into digital image data. The CIS line sensor 31 has at least a length corresponding to the main scanning width of the document, and reads pixel data corresponding to the main scanning width of the document line by line. The pulse generator circuit 30 generates a pulse for driving the CIS line sensor 31.

Note that the pulse generator circuit 30 can change a driving condition such as the scanning time of one main scan of the CIS line sensor 31 in accordance with a setting from the CPU 11.

The image processing unit 33 performs various image processes on image data. In particular, the image processing unit 33 includes a shading correction circuit 34 that performs shading correction on image data converted from an analog signal into a digital signal. The image data having undergone shading correction can be output from the communication I/F 15.

The CPU 11 drives the conveyance motor 20 serving as a driving portion for conveying a document, and determines the presence/absence of the document in accordance with the state of the document detection sensor 105. The read sensor 101 detects the leading and trailing ends of a conveyed document. The detection result is used to control the image reading timing of a document by the reading sensor 108, the feeding timing of the pickup roller 112 regarding document conveyance control, and the like. The opening and closing detection sensor 151 detects the opened/closed state of the ADF 4 capable of opening/closing the document reading region in the reading sensor 108. Note that details of the opening and closing detection sensor 151 will be described later with reference to FIG. 9.

Next, processing of automatically continuing the reading operation of the ADF 4 after the opening and closing detection sensor 151 detects the open state of the ADF 4 and then detects the closed state when the reading operation is stopped in a state in which there is no document in the reading region will be explained with reference to the flowcharts of FIGS. 4 to 7.

Note that programs that implement processes shown in the flowcharts of FIGS. 4 to 7 are stored in the ROM 13. The CPU 11 reads out and executes the processing programs to perform the respective processing operations.

Figure 4:
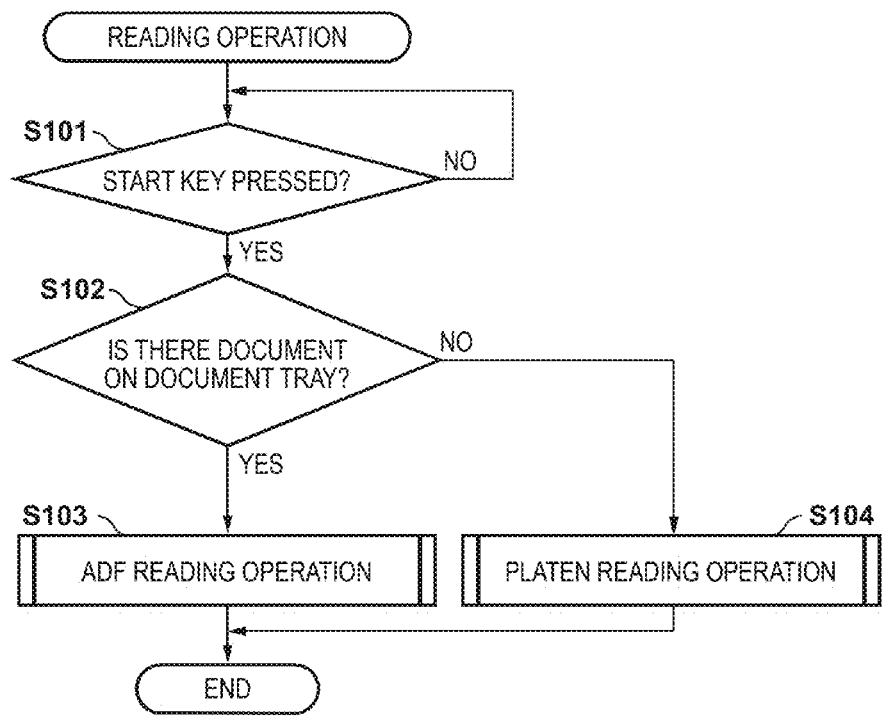
FIG. 4 is a flowchart showing a document reading control sequence.

First, in FIG. 4, the CPU 11 determines whether the start key of the operation unit 3 has been pressed (step S101). If the start key has not been pressed (NO in step S101), the CPU 11 waits until the start key is pressed. If the start key has been pressed (YES in step S101), the CPU 11 determines from the detection result of the document detection sensor 105 whether there is a document on the document tray 111 (step S102). If there is a document on the document tray 111 (YES in step S102), the CPU 11 performs the flow scanning operation using the ADF 4 (step S103). If there is no document on the document tray 111 (NO in step S102), the CPU 11 moves the reading sensor 108 to below the platen glass 107, and performs the platen reading operation (step S104). Note that the platen reading operation can be implemented using a well-known technique, and details thereof will be omitted.

Figure 5A:
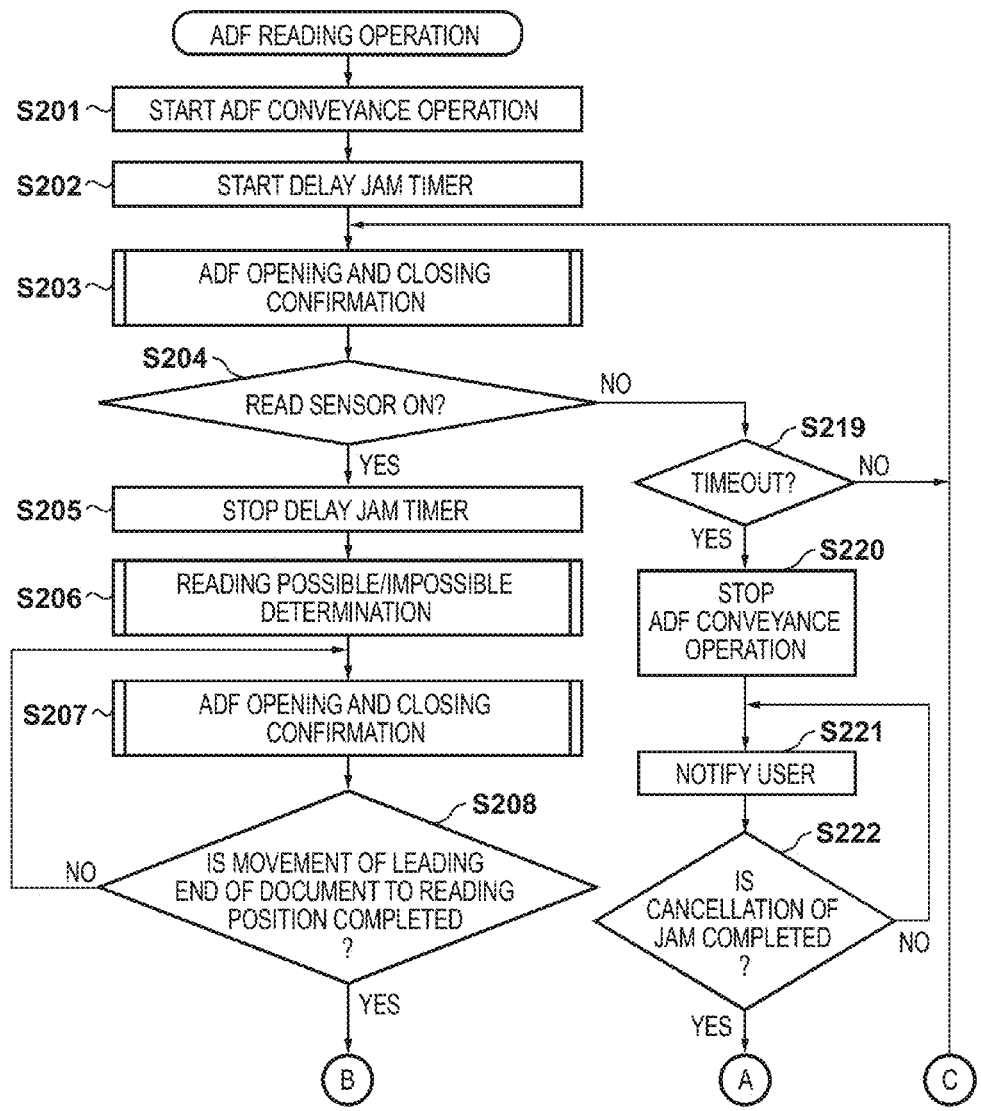
FIGS. 5A and 5B are flowcharts showing an ADF reading operation in the document reading control sequence.
Figure 5B:
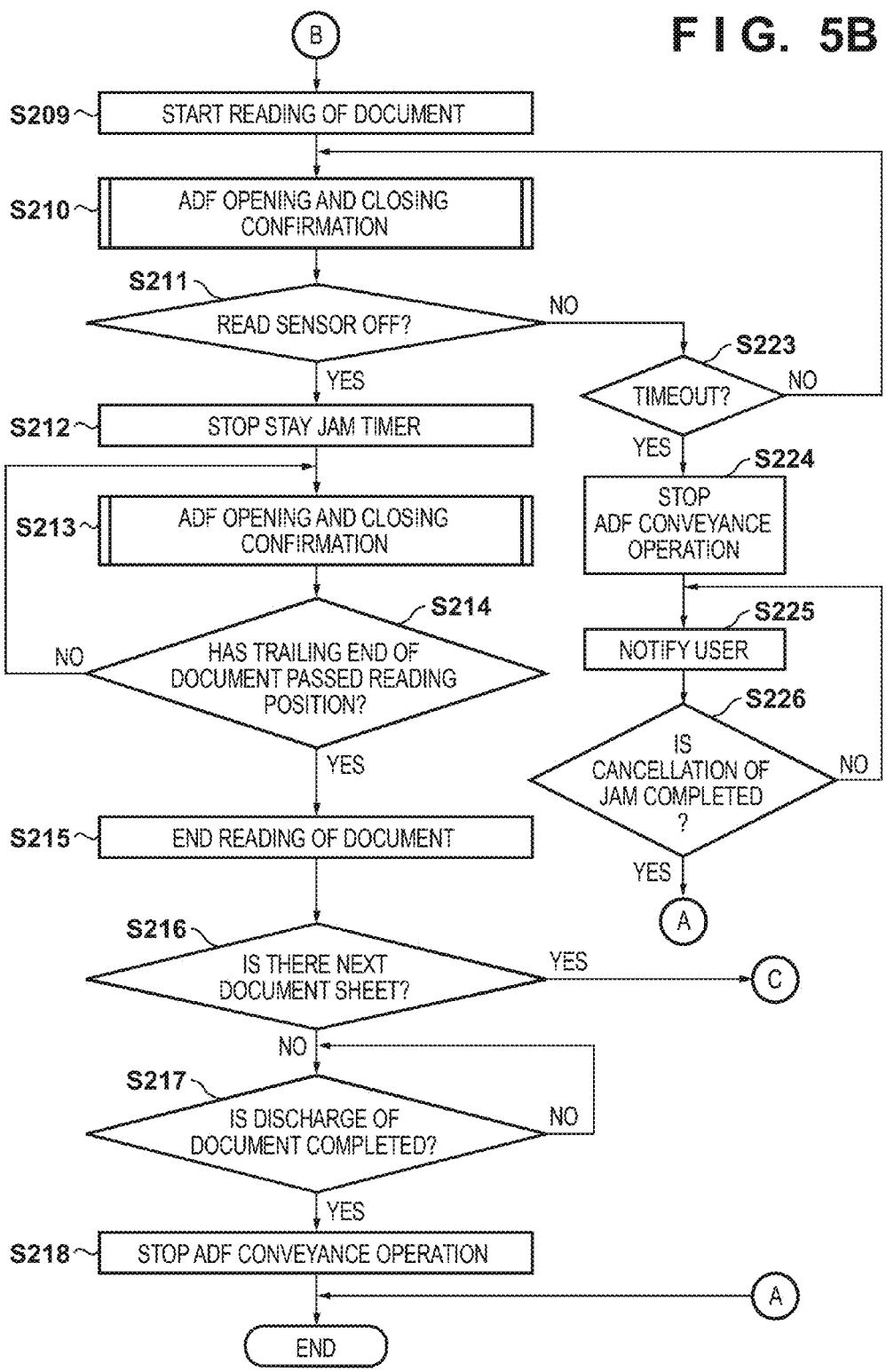

FIGS. 5A and 5B are flowcharts showing details of the ADF reading operation in step S103 of FIG. 4. At the start of the ADF reading operation, the CPU 11 drives the conveyance motor 20 to start document conveyance by the ADF 4 (step S201). Then, the CPU 11 starts a delay jam timer implemented by the internal timer of the CPU 11 (step S202). The CPU 11 performs ADF opening and closing confirmation based on the detection result of the opening and closing detection sensor 151 (step S203). Details of the ADF opening and closing confirmation will be explained later with reference to FIG. 6. The CPU 11 determines whether the read sensor 101 is ON (step S204).

Note that when the read sensor 101 has not detected a document in a predetermined time after the start of the delay jam timer, the CPU 11 determines that a jam (delay jam) has occurred on a conveyance path extending up to the read sensor 101. The predetermined time is an empirically and statistically set time value.

If the read sensor 101 is OFF (NO in step S204), the CPU 11 determines whether a timeout of the delay jam timer has occurred (step S219). If a timeout of the delay jam timer has not occurred (NO in step S219), the CPU 11 returns to step S203 and performs the ADF opening and closing confirmation operation. If a timeout of the delay jam timer has occurred (YES in step S219), the CPU 11 determines that a delay jam has occurred, and stops the conveyance operation of the document by the ADF 4 (step S220). The CPU 11 then notifies the user via the display unit of the operation unit 3 that the jam has occurred and the document needs to be removed (step S221). After that, the CPU 11 determines whether the document causing the delay jam has been removed and the cancellation of the jam is completed (step S222). Whether the document causing the delay jam has been removed is determined based on whether the detection result of the document detection sensor 105 has changed.

If the cancellation of the jam is not completed (NO in step S222), the CPU 11 returns to step S221 and continues the notification to the user. If the cancellation of the jam is completed (YES in step S222), the CPU 11 ends the processing in the flowchart of FIGS. 5A and 5B. In this case, the user cancels the jam, then sets the document again on the document tray 111, presses the start key of the operation unit 3, and can perform reading of the document again by the reading sensor 108 and the ADF 4. At this time, the CPU 11 performs the control from step S101 in the flowchart of FIG. 4.

In this embodiment, a delay jam is detected based on whether the leading end of a document has reached the position of the read sensor 101 in a predetermined time after the conveyance of the document is started and the delay jam timer is started. However, the delay jam detection method is not limited to the above-described detection method. For example, it is also possible to provide a new sensor between the read sensor 101 and the document detection sensor 105, and detect a delay jam based on whether the leading end of a document has reached the position of the new sensor in a predetermined time after the start of conveying the document. When a delay jam is detected using a sensor different from that in the embodiment, a delay jam timer suited to the sensor is set, and the determination of whether a document causing the delay jam has been removed is also performed using this sensor.

If the read sensor 101 is ON (YES in step S204), the CPU 11 stops the delay jam timer (step S205). Then, the CPU 11 determines whether the reading operation is possible (step S206). Even if the user issues a reading instruction from the operation unit 3, image reading of the document by the reading sensor 108 and the ADF 4 may not be started because the controller 16 does not issue a reading request owing to a factor to be described later. For this reason, the determination of whether the reading operation is possible is performed based on whether there is a reading request from the controller 16. The reading operation possible/impossible determination will be described later with reference to FIG. 6.

If there is no reading request from the controller 16 and the reading operation is impossible, the conveyance of the document is temporarily stopped until a reading request from the controller 16 is received. At this time, the position where the conveyance of the document is temporarily stopped is before a position where the reading sensor 108 starts reading. More specifically, the conveyance of the document is temporarily stopped so that the leading end of the document is stopped at a stop position P2 (FIGS. 8A to 8C) on the upstream side in the document conveyance direction with respect to the reading position P1. If it is determined by the reading possible/impossible determination in step S206 that the reading operation is possible, a stay jam timer implemented by the internal timer of the CPU 11 is started. Thereafter, the CPU 11 performs the ADF opening and closing confirmation based on the detection result of the opening and closing detection sensor 151 (step S207). Note that details of the reading possible/impossible determination in step S206 including the start of the stay jam timer will be described later with reference to FIGS. 5A and 5B.

After that, the CPU 11 determines whether the movement of the leading end of the document to the reading position P1 is completed (step S208). At this time, whether the leading end of the document has moved to the reading position P1 is determined based on the rotation speed of the conveyance motor 20 after detecting the leading end of the document by the read sensor 101. This determination may also be performed by determining by the CPU 11 whether a predetermined time has elapsed after detecting the leading end of the document by the read sensor 101. If the movement of the leading end of the document is not completed (NO in step S208), the CPU 11 returns to step S207 and executes the ADF opening and closing confirmation till the completion of the movement. If the movement of the leading end of the document is completed (YES in step S208), the CPU 11 starts document reading (step S209). Along with the reading operation of the document, the CPU 11 performs the ADF opening and closing confirmation based on the detection result of the opening and closing detection sensor 151 (step S210). The CPU 11 determines whether the read sensor 101 is OFF (step S211).

If the read sensor 101 is ON (NO step S211), the CPU 11 determines whether a timeout of the stay jam timer has occurred (step S223). Note that when the read sensor 101 is turned on and is not turned off in a predetermined time after the start of the stay jam timer, the CPU 11 determines that a jam (stay jam) has occurred on a document conveyance path near the read sensor 101. The predetermined time is an empirically and statistically set time value. The reading position P1 corresponds to the document reading region in the reading sensor 108.

If a timeout of the stay jam timer has not occurred (NO in step S223), the CPU 11 returns to step S210. If a timeout of the stay jam timer has occurred (YES in step S223), the CPU 11 determines that a stay jam has occurred, and stops the conveyance operation of the document by the ADF 4 (step S224). The CPU 11 then notifies the user via the display unit of the operation unit 3 that the jam has occurred and the document needs to be removed (step S225).

The CPU 11 determines whether the document causing the stay jam has been removed and the cancellation of the jam is completed (step S226). Whether the document causing the stay jam has been removed is determined based on whether the detection result of the read sensor 101 has changed. If the cancellation of the jam is not completed (NO in step S226), the CPU 11 returns to step S225 and continues the notification to the user. If the cancellation of the jam is completed (YES in step S226), the CPU 11 ends the processing in the flowchart of FIGS. 5A and 5B. In this case, the user cancels the jam, then sets the document again on the document tray 111, presses the start key of the operation unit 3, and can perform reading of the document again by the reading sensor 108 and the ADF 4. At this time, the CPU 11 starts the control from step S101 in the flowchart of FIG. 4.

In this embodiment, when the read sensor 101 is not turned off in a predetermined time after it is turned ON, that is, when the read sensor 101 has not detected the trailing end of the document in the predetermined time, the detection of a stay jam is performed. However, the stay jam detection method is not limited to the above-described detection method. For example, it is also possible to provide a new sensor between the read sensor 101 and the document detection sensor 105, and detect a jam by using the new sensor and the document detection sensor, or detect a jam by using the new sensor and the read sensor 101. When a stay jam is detected using a sensor different from that in the embodiment, a stay jam timer suited to the sensor is set, and even the determination of whether a document causing the stay jam has been removed is performed using this sensor.

If the read sensor 101 is OFF (YES in step S211), the CPU 11 stops the stay jam timer (step S212). Then, the CPU 11 performs the ADF opening and closing confirmation based on the detection result of the opening and closing detection sensor 151 (step S213). The CPU 11 determines whether the trailing end of the document has passed the reading position P1 (step S214). At this time, whether the trailing end of the document has passed the reading position P1 is determined by the CPU 11 based on the rotation speed of the conveyance motor 20 after detecting the trailing end of the document by the read sensor 101. This determination may also be performed by determining by the CPU 11 whether a predetermined time has elapsed after detecting the trailing end of the document by the read sensor 101. If the trailing end of the document has not passed the reading position P1 (NO in step S214), the CPU 11 returns to step S213 and waits until the trailing end of the document passes the reading position P1 while performing the ADF opening and closing confirmation. If the trailing end of the document has passed the reading position P1 (YES in step S214), the CPU 11 ends the reading of the document (step S215).

Note that in this document reading operation, image data (pixel data each of one line) obtained every time the CIS line sensor 31 of the reading sensor 108 reads each line of a document conveyed by this operation are sequentially stored in the RAM 17. After the end of reading one document sheet, image data of this document sheet is stored in the RAM 17.

If the trailing end of the document has passed the reading position P1 and the reading of the document ends, the CPU 11 determines the presence/absence of the next document sheet from the detection result of the document detection sensor 105 (step S216). If there is the next document sheet (YES in step S216), the CPU 11 returns to step S203. If there is no next document sheet (NO in step S216), the CPU 11 determines whether the document has been discharged from the discharge/reverse roller 118 (step S217). Here, it is also possible to provide a discharge sensor at the discharge port, and determine based on the detection result of the discharge sensor whether the discharge of the document is completed. Alternatively, the determination may be performed based on the timing after the read sensor 101 is turned off or the timing after the trailing end of the document has passed the reading position P1. If the discharge of the document is not completed (NO in step S217), the CPU 11 waits till the completion of discharging the document. If the discharge of the document is completed (YES in step S217), the CPU 11 stops the conveyance operation of the document by the ADF 4, and ends the processing (step S218).

Figure 6:
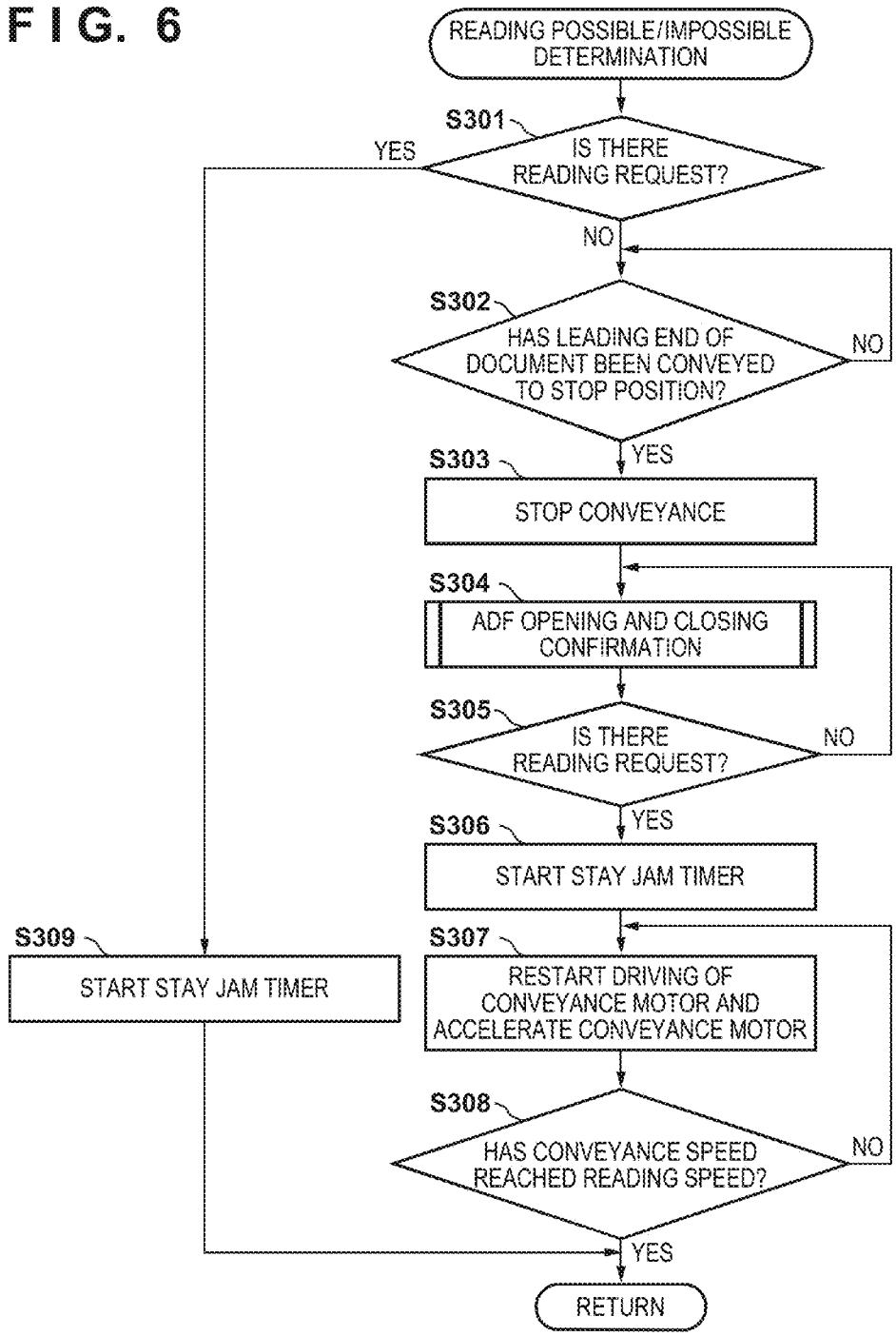
FIG. 6 is a flowchart showing details of reading possible/impossible determination in the document reading control sequence.

FIG. 6 is a flowchart showing details of the reading possible/impossible determination in step S206 of FIG. 5A.

First, the CPU 11 determines whether there is an image reading request from the controller 16 (step S301). If there is a reading request from the controller 16 (YES in step S301), the CPU 11 starts the stay jam timer (step S309). Thereafter, the CPU 11 returns to the processing in the flowchart of FIGS. 5A and 5B.

If there is no reading request from the controller 16 (NO in step S301), the CPU 11 determines whether the leading end of the document has been conveyed to the stop position P2 to be described later (step S302). The stop position P2 is set between the reading position P1 and a position where the read sensor 101 detects the leading end of a document. Whether the document has been conveyed to the stop position P2 may be determined by counting the number of pulses of the conveyance motor 20 after detecting the leading end of the document by the read sensor 101, or by measuring the time after detecting the leading end of the document by the read sensor 101.

If the leading end of the document has not been conveyed to the stop position P2 (NO in step S302), the CPU 11 drives the conveyance motor 20 to continue the conveyance of the document. If the leading end of the document has been conveyed to the stop position P2 (YES in step S302), the CPU 11 stops the conveyance motor 20 and stops the conveyance of the document (step S303). The CPU 11 then performs the opening and closing confirmation operation of the ADF 4 (step S304). The CPU 11 determines whether there is an image reading request from the controller 16 (step S305).

If there is no image reading request (NO in step S305), the CPU 11 returns to step S304 and performs the opening and closing confirmation operation of the ADF 4. If there is an image reading request (YES in step S305), the CPU 11 starts the stay jam timer (step S306). While restarting the driving of the conveyance motor 20 and accelerating the conveyance motor 20, the CPU 11 restarts the conveyance of the document (step S307). At this time, the conveyance motor 20 is accelerated because a predetermined reading speed is necessary to read the document image by the reading sensor 108, and the conveyance speed of the document needs to be a speed suited to the predetermined reading speed.

The acceleration of the conveyance motor 20 continues until the speed suited to the reading speed is obtained. The CPU 11 determines whether the conveyance speed has reached the reading speed (step S308). If the conveyance speed has not reached the reading speed (NO in step S308), the CPU 11 returns to step S307 and continues the acceleration of the conveyance motor 20. If the conveyance speed has reached the reading speed (YES in step S308), the CPU 11 returns to the processing in the flowchart of FIGS. 5A and 5B.

At this time, a case in which there is no reading request from the controller 16 is, for example, a case in which image data is directly transmitted from the controller 16 to an external FAX apparatus via the communication I/F 15. In this case, the CPU 11 stops the conveyance of a document so as to stop the leading end of the document at the stop position P2 in order to connect a communication line to the external FAX apparatus. The stop position P2 is a position where a document can be read in a shortest time when the conveyance motor 20 is driven to restart the conveyance of the document. That is, the stop position P2 is a position where the conveyance motor 20 can be accelerated satisfactorily so as to obtain a document conveyance speed suited to the reading speed of the reading sensor 108 while conveying the document to the reading position P1. The stop position P2 can be an arbitrary position as long as the stop position P2 is at least a position on the upstream side in the document conveyance direction with respect to the reading position P1, and the reading of a document can be normally performed at the reading position P1 when the conveyance of the document is restarted.

Another example of the case in which there is no reading request from the controller 16 is a case in which the memory of the controller 16 runs short and the controller 16 cannot receive image data read by the reading sensor 108 of the image reading apparatus 1. This is because a processing request to the image forming apparatus 2 is sometimes generated during reading of a document image by the image reading apparatus 1 in the case of an apparatus including the image reading apparatus 1 and the image forming apparatus 2, as shown in FIG. 1. At this time, if there is a processing request exceeding the memory capacity of the controller 16, the reading of the image by the image reading apparatus 1 is temporarily stopped in some cases. The CPU 11 controls the stop operation at this time so as to stop the leading end of the document at the stop position P2, as in the above-described communication to the FAX apparatus.

Figure 7:
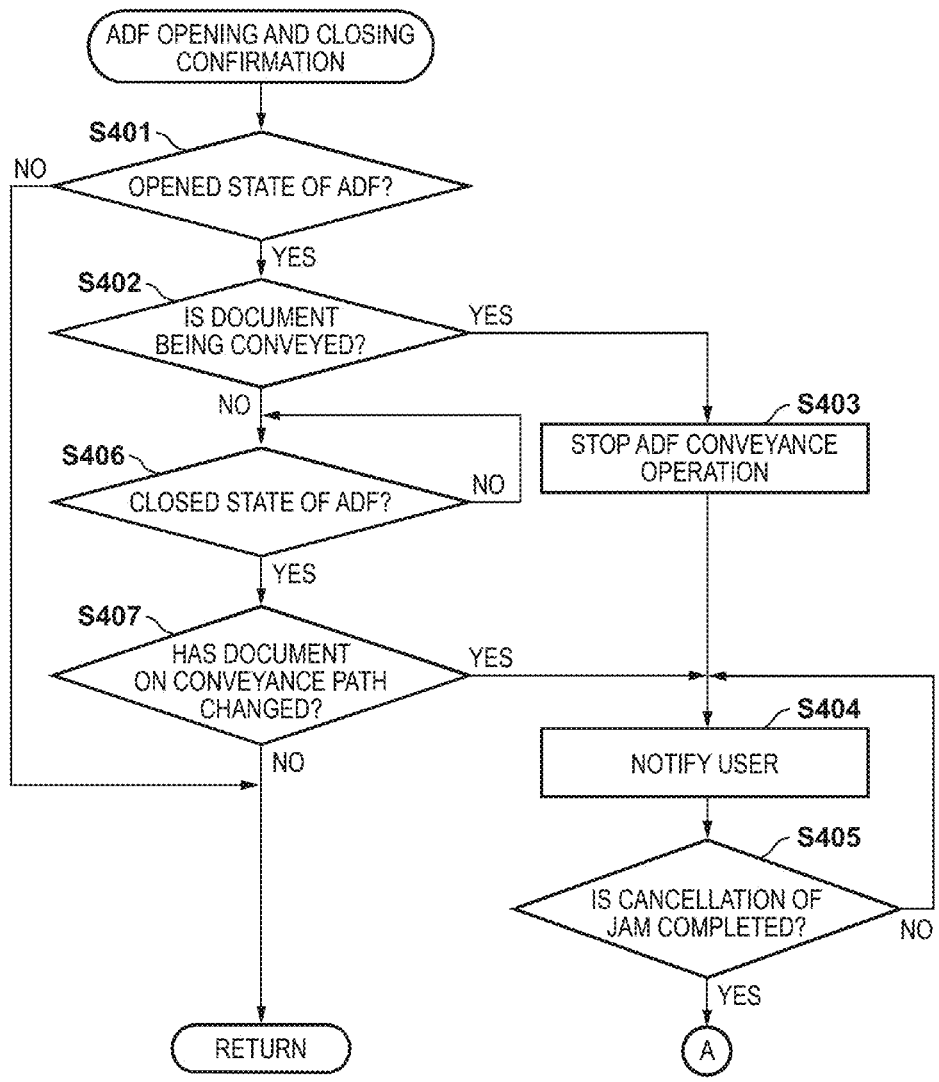
FIG. 7 is a flowchart showing an ADF opening and closing confirmation operation in the document reading control sequence.

FIG. 7 is a flowchart showing details of the ADF opening and closing confirmation operation in step S203, S207, S210, S213, or S304. First, the CPU 11 determines, from the detection result of the opening and closing detection sensor 151, whether the ADF 4 is in the open state (step S401). Details of the opening and closing detection sensor 151 will be described later with reference to FIGS. 9 to 11. If the detection result of the opening and closing detection sensor 151 does not represent the open state (NO in step S401), that is, the ADF 4 is in the closed state, the CPU 11 ends the processing and returns to the flowchart of FIGS. 5A and 5B.

If the ADF 4 is in the open state (YES in step S401), the CPU 11 determines whether a document is being conveyed (step S402). If a document is being conveyed (YES in step S402), the CPU 11 stops the conveyance operation of the document by the ADF 4 (step S403). The CPU 11 notifies the user via the display unit of the operation unit 3 that a jam has occurred and the document needs to be removed (step S404). At this time, the user is notified to remove the document after stopping the conveyance because, if the ADF 4 is opened during document conveyance, the conveyance of the document and the restart of reading become difficult depending on a position where the conveyance operation of the document is stopped.

After the notification in step S404, the CPU 11 determines whether the user has removed the document in the conveyance path of the ADF 4 and canceled the jam state (step S405). If the cancellation of the jam is not completed (NO in step S405), the CPU 11 returns to step S404 and continues the notification to the user. The determination of whether the jam state has been canceled is performed based on whether the detection results of various sensors provided on the conveyance path in the ADF 4, such as the read sensor 101, have changed before and after the conveyance operation of the document is stopped in step S403. If the cancellation of the jam is completed (YES in step S405), the CPU 11 ends the processing in the flowchart of FIGS. 5A and 5B. In this case, after the user cancels the jam, he sets the document again on the document tray 111, presses the start key of the operation unit 3, and can perform rereading of the document by the reading sensor 108 and the ADF 4. When the user presses the start key of the operation unit 3, the CPU 11 starts the control from step S101 in the flowchart of FIG. 4.

If a document is not being conveyed (NO in step S402), the CPU 11 determines whether the ADF 4 is in the closed state (step S406). If the ADF 4 is not in the closed state (NO in step S406), the CPU 11 waits until the ADF 4 changes to the closed state. If the ADF 4 is in the closed state (YES in step S406), the CPU 11 determines whether the document on the conveyance path has changed before and after the ADF 4 changes to the closed state (step S407). In this case, whether the document on the conveyance path has changed, that is, whether the document on the conveyance path has been removed is determined by comparing the detection results of various sensors provided on the conveyance path in the ADF 4, such as the read sensor 101, before and after the closed state of the ADF 4 is detected. If the document on the conveyance path has changed before and after the ADF 4 changes to the closed state (YES in step S407), the CPU 11 notifies the user via the operation unit 3 until all document sheets on the conveyance path are removed (steps S404 and S405).

If the jam state is canceled (YES in step S405), the CPU 11 ends the processing in the flowchart of FIGS. 5A and 5B. Even in this case, after the user cancels the jam, he sets the document again on the document tray 111, presses the start key of the operation unit 3, and can perform reading of the document by the reading sensor 108 and the ADF 4. When the user presses the start key of the operation unit 3, the CPU 11 starts the control from step S101 in the flowchart of FIG. 4. This is because, even when it is determined in step S402 that a document is not being conveyed, if a document on the conveyance path in the ADF 4 has been removed, the removed document needs to be read again. This can prevent the end of the reading operation in a state in which the removed document is not read and its image data is omitted.

If the document on the conveyance path has not changed and it is determined that the document has not been removed (NO in step S407), the CPU 11 returns to the previous flow. This previous flow indicates the flowchart of the reading possible/impossible determination in FIG. 6. This is because the ADF opening and closing confirmation step of determining that a document is not being conveyed (NO in step S402) is only step S304 of FIG. 6. When the open state of the ADF 4 is detected in the ADF opening and closing confirmation in steps S203, S207, S210, and S213 of FIGS. 5A and 5B, it is determined that the open state of the ADF 4 has been detected during document conveyance (YES in step S402). The document during conveyance has jammed and is processed, and the flow scanning operation is stopped.

In this embodiment, sensors provided on the conveyance path of the ADF 4 are the read sensor 101 and the document detection sensor 105. However, in addition to these sensors, a sensor for detecting a document may be provided on the conveyance path. By using these sensors for detecting a document on the conveyance path, a change of the detection result of a document before and after the ADF 4 changes to the open state may be detected. With this arrangement, when the user is highly likely to fail in obtaining intended read data even in a state in which the conveyance of the document is stopped, the user can be notified that reading needs to be performed again. The state in which a document is not being conveyed is a state in which there is no image reading request from the controller 16 and the conveyance of the document is stopped at the stop position P2, as described above. Hence, only in the opening and closing confirmation operation of the ADF 4 in step S304, it is determined in step S402 that a document is not being conveyed.

Also, the state in which a document is not being conveyed is generated when a conveyance failure such as a delay jam or a stay jam occurs and the conveyance operation of a document is stopped. In this case, however, when the jam state is canceled, as shown in FIGS. 5A and 5B, the reading operation is stopped, and the flowchart of FIGS. 5A and 5B is ended. Even if the ADF 4 changes to the closed state, neither conveyance nor reading of the document is restarted.

Note that the determination of the closed state of the ADF 4 in step S406 may be performed after a predetermined time. The predetermined time is set empirically and statistically as the time taken for the operation of opening/closing the ADF 4 by the user. Especially in the processing of step S406, if a document is not being conveyed, the restart of the conveyance operation of the document by the ADF 4 is permitted after detecting that the ADF 4 changes from the open state to the closed state. However, the restart is not limited to this. For example, the conveyance operation of the document by the ADF 4 may be stopped after detecting the open state of the ADF 4. In this case, when the leading end of the document is stopped upstream in the document conveyance direction with respect to the reading position P1, the conveyance of the document by the ADF 4 and the restart of the reading operation of the document by the reading sensor 108 may be permitted in accordance with a user instruction from the operation unit 3 or by detecting the closed state of the ADF 4. Alternatively, the conveyance of the document by the ADF 4 may be stopped when the opening and closing detection sensor 151 detects the open state of the ADF 4 before the start of conveying the document by the pickup roller 112 after the CPU 11 accepts an instruction from the user via the operation unit 3 to perform the reading operation of a document image. In this case, when the closed state of the ADF 4 is detected, the conveyance operation of the document by the ADF 4 may be restarted to permit the reading operation of the document image by the reading sensor 108.

As described above, in this embodiment, when the open state of the ADF 4 is detected, if the reading operation of a document can be restarted in response to detection of the closed state of the ADF 4, the reading operation of the document is restarted. Usability in image reading of a conveyed document can therefore be improved without generating an unwanted jam or issuing a rereading request for the document.

FIGS. 8A to 8C show the states of document sheets on the conveyance path in a detection result control sequence using the ADF 4 that is executed by the image reading apparatus 1.

FIG. 8A shows a state in which two document sheets are stacked on the document tray 111 of the ADF 4. FIG. 8B shows a state in which the conveyance of the first document sheet is temporarily stopped. FIG. 8C shows a state in which the two document sheets are discharged on the discharge tray 119 of the ADF 4.

In this embodiment, for example, when directly transmitting image data read by the image reading apparatus 1 to an external FAX apparatus, the conveyance/reading operation of the document starts from the state of FIG. 8A, and the conveyance of the document is temporarily stopped in the state of FIG. 8B. At this time, the conveyance of the document is temporarily stopped at a position where its leading end reaches the stop position P2. As described above, the stop position P2 is a position where a document can be read in a shortest time when the conveyance motor 20 is driven to restart the conveyance of the document. That is, the stop position P2 is a position (position on the upstream side in the document conveyance direction with respect to the reading position P1) where the conveyance motor 20 can be accelerated satisfactorily so as to obtain a document conveyance speed suited to the reading speed of the reading sensor 108 while conveying the document to the reading position P1. When directly transmitting image data to an external FAX apparatus, the conveyance of a document is temporarily stopped because the CPU 11 needs to connect a line to the external FAX apparatus and the connection takes time. The conveyance of the document is stopped at the stop position P2 so that the reading of the document can be restarted immediately after line connection.

After the line is connected to the external FAX apparatus, the conveyance motor 20 is driven and accelerated to restart the conveyance of the document, conveyance of which is stopped at the stop position P2, and read the document at the reading position P1 by using the reading sensor 108. Then, the document set on the document tray 111 is read. After the end of transmitting all image data to the external FAX apparatus, the document is normally discharged to the discharge tray 119, as shown in FIG. 8C. After the end of transmitting image data to the external FAX apparatus, the CPU 11 disconnects the connected line.

In the case of an apparatus including the image reading apparatus 1 and the image forming apparatus 2, as shown in FIG. 1, the image forming apparatus 2 sometimes accepts a request of image formation or the like during reading processing of a document image by the image reading apparatus 1. At this time, for example, when the memory capacity of the controller 16 runs short, the reading processing of the document image by the image reading apparatus 1 is temporarily stopped in some cases. Even in this case, the document is stopped at the stop position P2, as shown in FIG. 8B. This can advance the restart of reading of the document.

When the conveyance of the document is temporarily stopped, as shown in FIG. 8B, the user sometimes opens the ADF 4 and changes the shape of the document conveyance path in order to confirm the conveyance state of the document. In this embodiment, even if the opening and closing detection sensor 151 detects the open state of the ADF 4 in the case in which the conveyance of the document is temporarily stopped, as shown in FIG. 8B, it is not determined that the document on the conveyance path has jammed. Even when the open state of the ADF 4 is detected, if the connection to the external FAX apparatus ends or image formation by the image forming apparatus 2 or the like ends, the image reading apparatus 1 and the ADF 4 can restart reading and conveyance of the document in response to detection of the closed state of the ADF 4. In this embodiment, when the reading of the document, conveyance of which is temporarily stopped, can be restarted, if the closed state of the ADF 4 is detected, the conveyance and reading of the document are restarted. It therefore becomes possible to prevent an unwanted jam, improve usability, and efficiently read the document.

Figure 9:
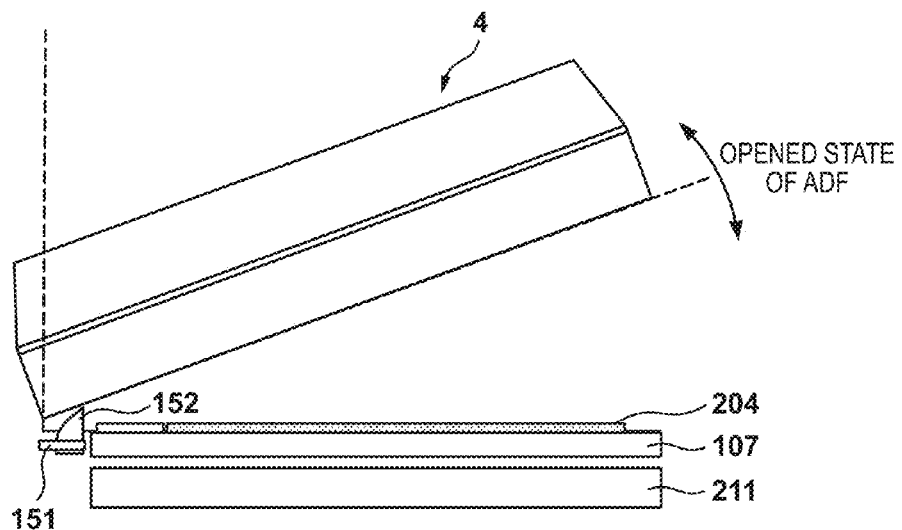
FIG. 9 is a view showing an example of the opening and closing detection mechanism of the ADF.

The opening and closing detection of the ADF 4 is implemented using an opening and closing detection mechanism shown in FIG. 9. FIG. 9 shows an example of the opening and closing detection mechanism of the ADF 4, and is a schematic plan view especially showing the open state of the ADF 4. Note that FIG. 9 shows a platen glass in which the main scanning direction of the platen glass 107 corresponds to the lateral width (widthwise direction) direction of a set document 204, and the sub-scanning direction of the platen glass 107 corresponds to the longitudinal width (lengthwise direction) direction of the document 204. FIG. 9 shows a case in which the ADF 4 is pivotally attached to one side portion of the housing of the image reading apparatus 1 to be parallel to the sub-scanning direction of the platen glass 107.

In FIG. 9, an opening and closing detection flag 152 is provided, which vertically moves in synchronism with vertical opening/closing of the ADF 4 itself with respect to the platen glass 107. Further, the opening and closing detection sensor 151 (physical mechanism (for example, a photosensor or switch)), ON/OFF of which is switched in accordance with the vertical movement of the opening and closing detection flag 152 is provided below the opening and closing detection flag 152. With this arrangement, when the ADF 4 changes to the open state, the opening and closing detection flag 152 moves up to turn on the opening and closing detection sensor 151, and the open state of the ADF 4 can be detected. To the contrary, when the ADF 4 changes to the closed state, the opening and closing detection flag 152 moves down to turn off the opening and closing detection sensor 151, and the closed state of the ADF 4 can be detected.

In the ADF opening and closing confirmation operation shown in FIG. 7, the detection state of the opening and closing detection sensor 151 is acquired to determine the opened/closed state of the ADF 4 and execute processing.

Note that FIG. 9 shows the case in which the ADF 4 is pivotally attached to one side portion of the housing of the image reading apparatus 1 that is parallel to the sub-scanning direction of the platen glass 107. However, the present invention is not limited to this. For example, even in a case in which the ADF 4 is pivotally attached to one side portion of the housing of the image reading apparatus 1 that is parallel to the main scanning direction of the platen glass 107, the ADF opening and closing confirmation operation shown in FIG. 7 can be similarly applied. In FIG. 9, the opened/closed state of the ADF 4 is detected by providing the opening and closing detection sensor 151 on the side of the platen glass 107. However, the opened/closed state of the ADF 4 may be detected by providing the opening and closing detection sensor 151 on the side of the ADF 4.

Figure 10:
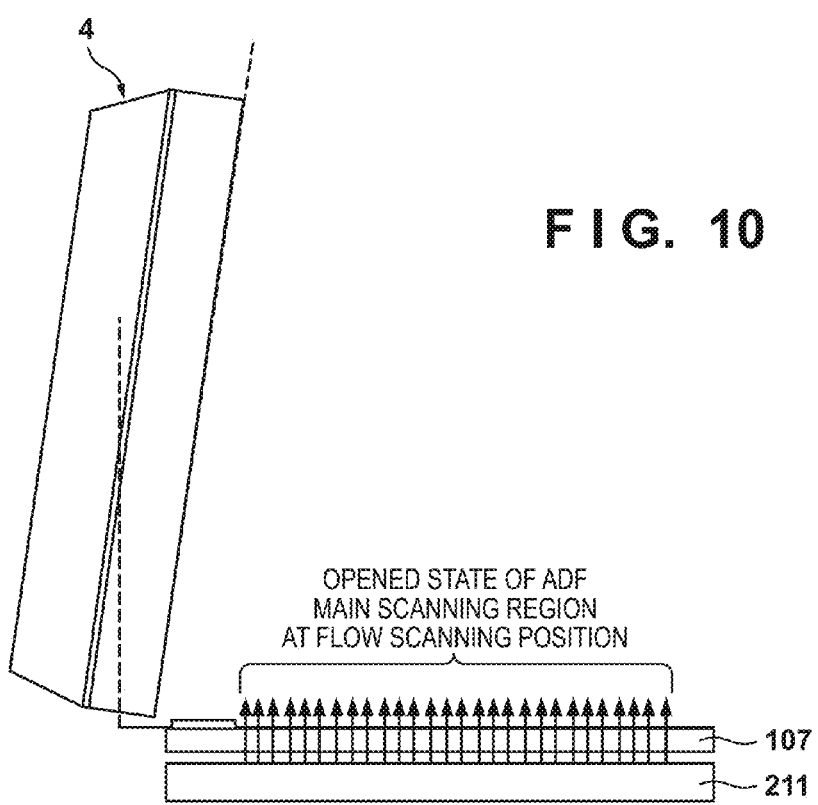
FIG. 10 is a view showing another example of the opening and closing detection mechanism of the ADF.

FIG. 10 shows another example of the opening and closing detection mechanism of the ADF 4. As in FIG. 9, FIG. 10 is a schematic plan view showing the open state of the ADF 4 in a case in which the ADF 4 is pivotally attached to one side portion of the housing of the image reading apparatus 1 that is parallel to the sub-scanning direction of the platen glass 107. In FIG. 10, the opening and closing detection of the ADF 4 is implemented based on pixel data obtained by the reading sensor 108. In this case, a light source 211 of the reading sensor 108 is turned on, and the opened/closed state of the ADF 4 is determined from pixel data of each line (main scanning width (main scanning region)) from the CIS line sensor 31 of the reading sensor 108 at the reading position P1.

More specifically, the opened/closed state of the ADF 4 is determined by paying attention to the difference in the pixel output level (luminance value) of pixel data of each line (main scanning width (main scanning region)) from the CIS line sensor 31 between the open state and closed state of the ADF 4. When the ADF 4 is in the open state, the ADF 4 does not exist on the platen glass 107, and light emitted by the light source 211 does not return to the CIS line sensor 31. In contrast, when the ADF 4 is in the closed state, the ADF 4 exists on the platen glass 107, and light emitted by the light source 211 is reflected by a platen guide or the like arranged above the reading position P1, and the CIS line sensor 31 receives the reflected light.

That is, when the light source 211 is turned on, the intensity of light received by the CIS line sensor 31 becomes higher in the closed state of the ADF 4 than in the open state of the ADF 4. In other words, the luminance of pixel data obtained from the CIS line sensor 31 becomes higher in the closed state of the ADF 4 than in the open state of the ADF 4. In a normal use environment, the pixel output level of the CIS line sensor 31 in the closed state of the ADF 4 becomes a pixel level A of a predetermined intensity in FIG. 11. In the same use environment, the pixel output level of the CIS line sensor 31 in the open state of the ADF 4 becomes a pixel level B of an intensity lower than the pixel level A in FIG. 11.

Figure 11:
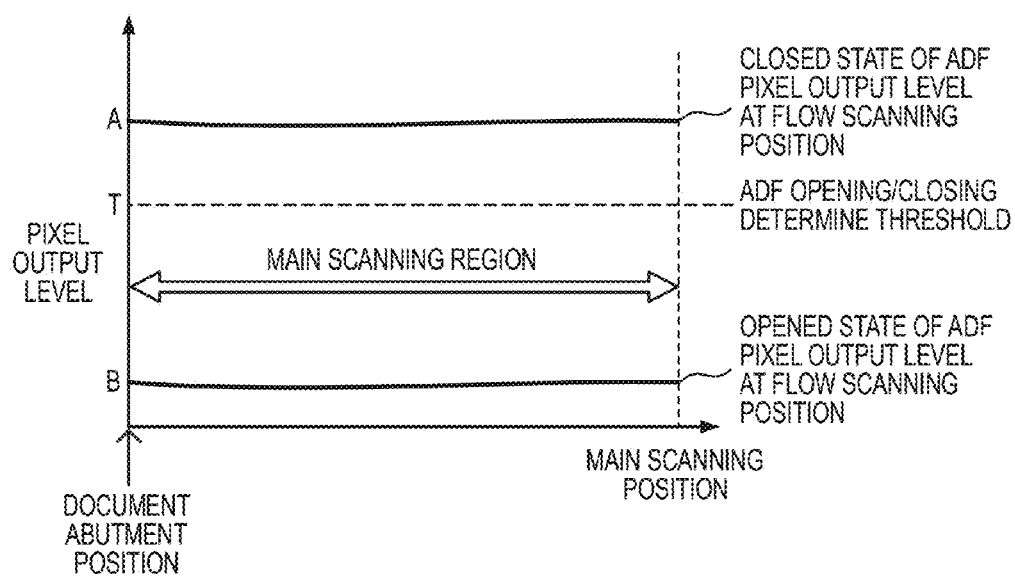
FIG. 11 is a graph showing main scanning pixel data when opening and closing detection of the ADF is determined based on pixel data.

Hence, a threshold T used to discriminate the pixel output level A and the pixel output level B is set. When the pixel output level is higher than the threshold T, it is determined that the ADF 4 is in the closed state. When the pixel output level is equal to or lower than the threshold T, it is determined that the ADF 4 is in the open state. In this determination, pixel data of each line (main scanning width (main scanning region)) output from the CIS line sensor 31 is monitored. When the constant pixel output level B at which obtained pixel data is lower than the threshold T shown in FIG. 11 is detected, it is detected that the ADF 4 is in the open state.

In the above-described opening and closing detection mechanism, a case in which the light source 211 is turned on has been explained. However, the opened/closed state of the ADF 4 may be detected from the output level of the CIS line sensor 31 in a state in which the light source 211 is turned off. In this case, the opening and closing determination criterion becomes opposite to the determination criterion described with reference to FIG. 11. The pixel output level of the CIS line sensor 31 becomes higher in the open state of the ADF 4 than in the closed state of the ADF. This is because, when the ADF 4 is in the open state, external light is received and the pixel output level of the CIS line sensor 31 becomes high, and when the ADF 4 is in the closed state, no external light is received and the pixel output level of the CIS line sensor 31 becomes low. By changing the opening and closing determination criterion in this manner, the opened/closed state of the ADF 4 can be detected from the output level of the CIS line sensor 31 regardless of whether the light source 211 is ON or OFF.

As in FIG. 9, FIG. 10 shows the case in which the ADF 4 is pivotally attached to one side portion of the housing of the image reading apparatus 1 that is parallel to the sub-scanning direction of the platen glass 107. However, the present invention is not limited to this. Even in a case in which the ADF 4 is pivotally attached to one side portion of the housing of the image reading apparatus 1 so as to be parallel to the main scanning direction of the platen glass 107, the ADF opening and closing confirmation operation shown in FIG. 7 can be similarly applied.

The opening and closing detection mechanisms shown in FIGS. 9 and 10 for the ADF 4 are merely examples, and the mechanism is not limited to them as long as the opened/closed state of the ADF 4 can be detected. For example, the opening and closing detection mechanisms in FIGS. 9 and 10 may be used in combination.

As described above, according to this embodiment, when the opening and closing detection sensor 151 serving as a detection unit detects the open state of the ADF in the reading operation of a document using the reading sensor 108 serving as a reading unit and the ADF 4, the conveyance of the document by the ADF 4 is stopped. After that, in response to detection of the closed state of the ADF 4, it is determined whether the conveyance of the document by the ADF 4 and the reading operation of the document image by the image reading apparatus 1 can be restarted. If it is determined that the conveyance of the document and the reading operation can be restarted, they can be restarted without setting again the document by the user after detecting the closed state of the ADF. By continuing and restarting the document reading operation, usability can be improved.

According to this embodiment, when the conveyance of the document by the ADF 4 is stopped at the stop position P2 on the upstream side in the document conveyance direction with respect to the reading position P1 in the document reading operation using the reading sensor 108 serving as a reading unit and the ADF 4 serving as a conveyance unit, even if the opening and closing detection sensor 151 serving as a detection unit detects the open state of the ADF 4, it is not determined that a jam has occurred owing to the opening of the ADF 4, and the reading operation is not stopped. If the closed state of the ADF 4 is detected later, the conveyance of the document by the ADF 4 and the reading operation of the document image by the reading sensor 108 can be restarted. Thus, usability can be improved without generating an unwanted jam.

In this embodiment, even when a document is not being conveyed, if a paper jam such as a delay jam or a stay jam occurs or if a document on the conveyance path of the ADF 4 is removed, the conveyance of the document is not restarted. It can therefore be prevented to end the reading operation in a state in which the removed document is not read and its image data is omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-139994, filed Jul. 7, 2014, and 2015-080338, filed Apr. 9, 2015, each of which is hereby incorporated by reference wherein in its entirety.

What is claimed is:

1. An image reading apparatus comprising:
    a reading unit configured to perform a reading operation of conveying a document to a reading region and reading an image of the document while conveying the document in the reading region, the reading unit being able to open and close the reading region;
    a detection unit configured to detect an closed state of the reading unit; and
    a control unit configured to, when the detection unit detects the closed state of the reading unit after the reading unit is opened, and if the reading operation is able to be restarted from a state of suspension in which the conveyance of the document by the reading unit is suspended, control the reading unit to restart the reading operation from the state of suspension.

2. The image reading apparatus according to claim 1, wherein when the detection unit detects an opened state of the reading unit, and if the document conveyed by the reading unit is determined not to have reached the reading region, the control unit permits the restart of the reading operation by the reading unit.

3. The image reading apparatus according to claim 1, wherein when the detection unit detects an opened state of the reading unit in the state of suspension in which the conveyance of the document by the reading unit is suspended, the control unit permits the restart of the reading operation by the reading unit.

4. The image reading apparatus according to claim 1, wherein when the detection unit detects an opened state of the reading unit in a state in which the reading unit conveys the document, the control unit does not permit the restart of the reading operation by the reading unit.

5. The image reading apparatus according to claim 1, further comprising a communication unit configured to perform communication with an external apparatus,
wherein when the communication unit performs communication, the control unit suspends the conveyance of the document by the reading unit on an upstream side in a document conveyance direction with respect to the reading region.

6. The image reading apparatus according to claim 1, wherein when a conveyance failure of the document conveyed by the reading unit is determined, the control unit suspends the conveyance of the document by the reading unit, and does not permit the restart of the reading operation by the reading unit.

7. The image reading apparatus according to claim 1, further comprising a platen including a transparent member on which the reading unit conveys the document,
wherein the detection unit is provided on the platen and detects the closed state of the reading unit.

8. The image reading apparatus according to claim 1, further comprising an operation unit configured to accept an instruction from a user,
wherein when the restart of the reading operation is determined to be possible and the operation unit accepts an instruction from the user, the control unit permits the restart of the reading operation by the reading unit.

9. The image reading apparatus according to claim 1, wherein when an output level of image data obtained by the reading unit is not higher than a predetermined threshold, the detection unit detects that the reading unit is in the closed state, and when the output level is higher than the predetermined threshold, the detection unit detects that the reading unit is in the opened state.

10. An image forming apparatus comprising:
an image reading apparatus defined in claim 1; and
an image forming unit configured to form an image on a printing medium based on an image read by the image reading apparatus.

11. An image reading apparatus comprising:
a reading unit configured to read an image of a document in a reading region;
a conveyance unit configured to convey the document to the reading region, stop the document in response to a stopping signal, and be capable of being opened and closed with respect to the reading region;
a detection unit configured to detect an opened state and a closed state of the conveyance unit; and
a control unit configured to, when the detection unit detects the closed state of the conveyance unit after the opened state thereof, and if the conveyance of the document by the conveyance unit is suspended on an upstream side in a document conveyance direction with respect to the reading region and a position where a reading operation by the reading unit is capable of being restarted, control the conveyance unit and the reading unit to restart the conveyance operation and the reading operation.

12. The image reading apparatus according to claim 11, further comprising a communication unit configured to perform communication with an external apparatus,
wherein the control unit sends out the stopping signal due to a communication between the communication unit and the external apparatus and stops the conveyance of the document by the conveyance unit on the position where a reading operation by the reading unit is capable to being restarted and the upstream side in the document conveyance direction.

13. The image reading apparatus according to claim 11, wherein when a conveyance failure of the document conveyed by the conveyance unit is determined, the control unit outputs the stopping signal and does not permit the conveyance unit and the reading unit from restarting the conveyance operation and the reading operation.

14. The image reading apparatus according to claim 11, further comprising a platen including a transparent member on which the reading unit conveys the document,
wherein the detection unit is provided on the platen and detects the opened state and the closed state of the reading unit.

15. The image reading apparatus according to claim 11, further comprising an operation unit configured to accept an instruction from a user,
wherein when the conveyance of the document by the conveyance unit is stopped on the upstream side in the conveyance direction with respect to the reading region and at the position where a reading operation by the reading unit is capable of being restarted and the operation unit accepts an instruction from the user, the control unit permits the restart of the conveyance by the conveyance unit and the reading operation by the reading unit.

16. The image reading apparatus according to claim 11, wherein when an output level of image data obtained by the reading unit is not higher than a predetermined threshold, the detection unit detects that the reading unit is in the closed state, and when the output level is higher than the predetermined threshold, the detection unit detects that the reading unit is in the opened state.

17. An image forming apparatus comprising:
an image reading apparatus defined in claim 11; and
an image forming unit configured to form an image on a printing medium based on an image read by the image reading apparatus.

18. The image reading apparatus according to claim 11, wherein the control unit controls the conveyance unit and the reading unit to, when the detection unit detects the closed state of the conveyance unit after the opened state thereof, and if the conveyance of the document by the conveyance unit is suspended on the position where the reading operation by the reading unit is capable of being restarted, restart the conveyance operation and the reading operation, and
the position is the upstream side in a document conveyance direction with respect to the reading region and where the conveyance velocity of the document by the conveyance unit is able to be accelerated into a readable velocity being able to be read by the reading unit at the reading region.

19. The image reading apparatus according to claim 11, wherein
when the detection unit detects the opened state of the conveyance unit in a state in which the conveyance unit conveys the document, the control unit does not permit the restart of the conveyance by the conveyance unit and the reading operation by the reading unit.

20. The image reading apparatus according to claim 11, wherein when a conveyance failure of the document conveyed by the conveyance unit is determined, the control unit outputs the stopping signal, and does not permit the restart of the conveyance by the conveyance unit and the reading operation by the reading unit if the detecting unit detects the closed state of the conveyance unit after the opened state thereof, even though the conveyance of the document by the conveyance unit is stopped on the upstream side of the conveyance direction with respect to the reading region and at a position that a reading operation by the reading unit is capable of being restarted.

21. A method of controlling an image reading apparatus including a reading unit configured to perform a reading operation of conveying a document to a reading region and reading an image of the document while conveying the document in the reading region, the reading unit being able to open and close the reading region, the method comprising:

detecting an opened state and a closed state of the reading unit; and controlling the reading unit to, when the opened state of the reading unit is detected in the detecting and then the closed state of the reading unit is detected in the detecting, and if the reading operation is able to be restarted from a state of suspension, restart the reading operation from the state of suspension.

22. A method of controlling an image reading apparatus including a reading unit configured to read an image of a document in a reading region, and a conveyance unit configured to convey the document to the reading region, stop the document in response to a stopping signal, and be capable of being opened and closed with respect to the reading region, the method comprising:

detecting an opened state and a closed state of the conveyance unit; and controlling the conveyance unit and the reading unit to, when the opened closed state of the conveyance unit is detected after the opened state thereof, and if the conveyance of the document by the conveyance unit is suspended on an upstream side in a document conveyance direction with respect to the reading region and a position where a reading operation by the reading unit is able to be restarted, restart the conveyance operation and the reading operation.

23. A non-transitory computer-readable storage medium storing a program for causing a computer to execute a control method of controlling an image reading apparatus including a reading unit configured to perform a reading operation of conveying a document to a reading region and reading an image of the document while conveying the document in the reading region, the reading unit being able to open and close the reading region, the program comprising:

detecting an opened state and a closed state of the reading unit; and controlling the reading unit to, when the opened state of the reading unit is detected in the detecting and then the closed state of the reading unit is detected in the detecting in the reading operation by the reading unit, and if the reading operation is able to be restarted from a state of suspension, restart the reading operation from the state of suspension.

24. A non-transitory computer-readable storage medium storing a program for causing a computer to execute a control method of controlling an image reading apparatus including a reading unit configured to read an image of a document in a reading region, and a conveyance unit configured to convey the document to the reading region and be capable of being opened and closed with respect to the reading region, the program comprising:

detecting an opened state and a closed state of the conveyance unit; and controlling the conveyance unit and the reading unit to, when the closed state of the conveyance unit is detected after the opened state thereof, and if the conveyance of the document by the conveyance unit is suspended on an upstream side in a document conveyance direction with respect to the reading region and a position where a reading operation by the reading unit is able to be restarted, restart the conveyance operation and the reading operation.

* * * * *